UNITED STATES PATENT OFFICE 1,997,144

PROCESS FOR THE MANUFACTURE OF VALUABLE PRODUCTS FROM ETHYLENE AND/OR ITS HOMOLOGUES

Max Hofsäsz, Amsterdam, Netherlands, assignor, by mesne assignments, to Shell Development Company, San Francisco, Calif., a corporation of Delaware No Drawing. Application March 3, 1930, Serial No. 432,978. In Great Britain March 18, 1929

12 Claims. (Cl. 196—10)

My invention relates to a process for the manufacture of valuable products from ethylene and/or its homologues by subjecting the initial material to a chemical treatment under pressure at a high temperature.

It is known that ethylene by subjecting it to elevated temperatures under relatively high pressure for the purpose of obtaining condensation- or polymerization-products therefrom is likely to decompose exothermically.

I have now found that such an undesired decomposition, which prevents the formation of the desired reaction-products, may be overcome by performing the reaction in the presence of a liquid medium.

When the reaction is carried out in a liquid, no decomposition of the ethylene or its homologues takes place, even when high temperature and high pressure are applied. Consequently various reactions, which are promoted by the application of pressure and increased temperature, now may be easily carried out with high yields of the desired reaction-products by applying the principle of the invention.

As a liquid medium various liquids may be used. Liquids such as mineral oils, vegetable oils or products obtained therefrom and also water or salts solutions are in many cases suitable for the purpose set forth. It is possible to use both inert liquids which do not participate in the reaction and liquids which undergo a chemical change during the treatment. In the latter case the liquid medium may be converted into more valuable products, as for instance different hydrocarbon oils obtained from mineral oils or from carbonaceous materials by destructive hydrogenation, which at high temperature and pressure are split into hydrocarbons of lower molecular weight. Thus, for example, the so-called Edeleanu-extract i. e. the liquid obtained by treating hydrocarbon oils with sulphur dioxide, which contains substantial amounts of aromatic and unsaturated constituents of the oil, may be used as a liquid medium for pressure treatment of ethylene and its homologues. The Edeleanu-extract is thereby converted into more valuable benzine-like products which are very suitable for use in internal combustion engines. If hydrogen is present or is formed during the reaction, also a hydrogenation of the products present may take place, or if phenols, cresols and the like or generally oxygen-containing compounds are used, such products may be freed from oxygen, whereby more valuable products are obtained, which, due to their benzine-like properties and anti-knock effect are of high value for serving as a fuel in internal combustion engines.

An important reaction, which may be facilitated by applying the aforesaid principle of the invention, is the conversion of ethylene into acetic acid by the action of water. By this reaction at the same time hydrogen is obtained according to the following formula:

$$C_2H_4 + 2H_2O = CH_3COOH + 2H_2$$

The water which is used for the reaction in the presence of substances promoting the reaction, preferably sodium hydroxide or potassium hydroxide or mixtures of substances which may react to generate said hydroxides, may serve at the same time as liquid medium, but an oily medium may also be used in addition to the aqueous medium. The reaction may, for instance, be performed at a pressure from 10 to 50 atmospheres. Besides acetic acid and hydrogen, also benzine-like products are formed, due to polymerization of the ethylene. The reaction temperature may be above 300° C. Favourable results for instance are obtained at a temperature of 360° C. and a pressure of 46 atmospheres. At the same temperature, increasing the pressure favourably affects the yield of acetic acid. Also by increasing the quantity of water more of the desired reaction products may be obtained.

Although not always essential, it is preferable in many cases, to perform the above and other reactions in the presence of substances which promote the reaction. Thus, for instance, the reaction between ethylene and water only gives a good yield of acetic acid if a quantity of sodium hydroxide or potassium hydroxide or a mixture of substances which may react to generate said hydroxides, for instance a mixture of sodium carbonate and calcium oxide with or without admixture with other suitable materials, is present. Also other catalytically acting substances, such as soluble glass, may be used.

The following examples illustrate the invention:

1. 250 grams of water and 65 grams of caustic soda are heated with ethylene in an autoclave in the presence of an oil which remains unaltered during the reaction. The pressure is maintained between 22 and 31 atmospheres, while the temperature is raised to 416° C. 44 litres of gas are obtained, containing 26 litres of hydrogen and 27 grams of acetic acid corresponding with a yield of 90 per cent. Besides hydrogen and acetic acid, 5 grams of an oil is obtained which appears to consist of hexamethylene.

2. 200 grams of water, 65 grams of caustic soda and 46 grams of ethylene are heated in an autoclave in the presence of inert oil at a temperature of 360° C. and at a pressure of 25-26.5 atmospheres. After one hour, 40 grams of benzine and 81 litres of gas containing 65.4 litres of hydrogen are formed and about 72 grams of acetic acid are isolated from the reaction mass.

3. Ethylene is compressed to a pressure of 25 atmospheres in an autoclave containing 360 grams of an aqueous solution containing 25% of potassium hydroxide. After heating during one hour at a temperature of 360° C. 72 grams of acetic acid, 100 litres of a gas containing 90 per cent of hydrogen and some grams of benzine are obtained.

4. Ethylene is heated in the presence of phenolatelye, which participates in the reaction, whereby sodium acetate or acetic acid, a neutral oil and hydrogen are obtained.

As stated above, the hydrogen which is formed may be used for hydrogenation or elimination of oxygen during the reaction. An experiment was carried out in which phenol was used as liquid medium, which was thereby converted into oxygen free benzine-like hydrocarbons. It may be observed that since the hydrogen which is formed by the above reaction is in statu nascendi, it is very active and suitable for the purpose set forth. Furthermore, since the hydrogen is under high pressure and free of substances which tend to poison catalysts, it is very suitable for various catalytic hydrogenations.

Also the polymerization of ethylene to benzine-like hydrocarbons may advantageously be carried out according to the invention. It appears that both the yield of benzine and the content of saturated compounds of the polymerized products are considerably improved when the reaction is carried out in a liquid medium. The polymerization may be performed without the slightest decomposition of the ethylene at a temperature from 300-500° C. and a pressure of 20-50 atmospheres. These temperatures and pressures are only given by way of example and may be varied within wide limits.

5. Ethylene is heated in an autoclave together with 300 grams of paraffin oil. At a pressure of 45 atmospheres and a temperature to 420° C., 50 grams of benzine are obtained.

It will be understood that it is not essential to use pure ethylene or homologues therefrom, but that the invention may also be applied to mixtures of the said compound or compounds with other substances. Thus, for instance, it is possible to utilize ethylene and/or its homologues containing products which are obtained by cracking certain mineral oil products or by the destructive hydrogenation of carbonaceous materials, such as coal, brown coal, tar, cellulose, lignite, wood, and hydrocarbons, such as mineral oils and products obtained therefrom. If necessary, such products may be subjected to a preliminary treatment such as cracking for the purpose of increasing their content of ethylene and/or its homologues.

Also other mixtures of the materials to be treated with other compounds or products, whether or not of inert character, may be used.

Furthermore, the reactions which are to be performed with the initial materials may be further facilitated by the presence of suitable catalysts. Thus, for instance, when a cracking of the liquid medium is desired, catalysts which are known to have a favourable action on the splitting may be employed and if hydrogen, which is developed or added during the reaction, should combine with any compound present, catalysts may be added which facilitate hydrogenation.

What I claim is:—

1. A method of manufacturing benzine-like products from ethylene, comprising subjecting ethylene in the presence of an inert liquid medium to a polymerization reaction at temperatures ranging from 300 to 500° C. while under a substantially superatmospheric pressure and in the absence of catalysts.

2. A method of manufacturing benzine-like products from ethylene, comprising subjecting ethylene in the presence of an inert liquid medium to a polymerization reaction at temperatures ranging from 300 to 500° C. while under pressures between 20 to 50 atmospheres and in the absence of catalysts.

3. A method of manufacturing benzine-like products from ethylene, comprising subjecting ethylene in the presence of paraffin oil to a polymerization reaction at temperatures ranging from 300 to 500° C. while under a substantially superatmospheric pressure and in the absence of catalysts.

4. A method of manufacturing benzine-like products from ethylene, comprising subjecting ethylene in the presence of paraffin oil to a polymerization reaction at approximately 420° C. while under a pressure of about 45 atmospheres and in the absence of catalysts.

5. A method of manufacturing benzine-like products, comprising subjecting reaction products containing hydrocarbons of the ethylene series obtained by cracking mineral oil products, in the presence of an inert liquid to a polymerization reaction at temperatures ranging from 300 to 500° C. while under a substantially superatmospheric pressure and in the absence of catalysts.

6. A method of manufacturing benzine-like products, comprising subjecting carbonaceous reaction products containing hydrocarbons of the ethylene series to a cracking treatment to increase the content of said hydrocarbons, heating the cracking reaction products containing said hydrocarbons in the presence of an inert liquid to temperatures ranging from 300 to 500° C. while under a substantially superatmospheric pressure and in the absence of catalysts to effect the polymerization of said hydrocarbons.

7. A method of manufacturing benzine-like products from low boiling hydrocarbons of the ethylene series, comprising subjecting the low boiling hydrocarbons of the ethylene series in the presence of an inert liquid medium to a polymerization reaction at temperatures ranging from 300 to 500° C. while under a substantially superatmospheric pressure and in the absence of catalysts.

8. A method of manufacturing benzine-like products from low boiling hydrocarbons of the ethylene series, comprising subjecting the low boiling hydrocarbons of the ethylene series in the presence of an inert liquid medium to a polymerization reaction at temperatures ranging from 300 to 500° C. while under pressures between 20 to 50 atmospheres and in the absence of catalysts.

9. A method of manufacturing benzine-like products from low boiling hydrocarbons of the ethylene series, comprising subjecting the low boiling hydrocarbons of the ethylene series in the presence of paraffin oil to a polymerization reaction at temperatures ranging from 300 to 500° C.

while under a substantially superatmospheric pressure and in the absence of catalysts.

10. A method of manufacturing benzine-like products, comprising subjecting carbonaceous reaction products containing hydrocarbons of the ethylene series to a cracking treatment to increase the content of low boiling hydrocarbons of the ethylene series, heating the cracking reaction products containing the said low boiling hydrocarbons in the presence of an inert hydrocarbon oil to temperatures ranging from 300 to 500° C. while under a substantially superatmospheric pressure and in the absence of catalysts to effect the polymerization of said low boiling hydrocarbons.

11. A method of manufacturing benzine-like products, comprising subjecting products containing hydrocarbons of the ethylene series obtained by cracking mineral oil products, in the presence of an inert liquid to a polymerization reaction at temperatures ranging from 300 to 500° C. while under a pressure between 20 and 50 atmospheres and in the absence of catalysts.

12. A method of manufacturing benzine-like products, comprising subjecting carbonaceous reaction products containing hydrocarbons of the ethylene series to a cracking treatment to increase the content of said hydrocarbons, heating the cracking reaction products containing said hydrocarbons in the presence of an inert liquid to temperatures ranging from 300 to 500° C. while under a pressure between 20 and 50 atmospheres and in the absence of catalysts to effect the polymerization of said hydrocarbons.

MAX HOFSÄSZ.